United States Patent [19]
Yang et al.

[11] Patent Number: 6,165,529
[45] Date of Patent: Dec. 26, 2000

[54] PROCESS FOR PREVENTING FRESH PRODUCE AND COATING COMPOSITION THEREFOR

[75] Inventors: Xiaoming Yang, San Diego; Robert J Petcavich, Del Mar; Lijun Mao, Murrieta; Li Yang, San Diego, all of Calif.

[73] Assignee: Planet Polymer Technologies, Inc., San Diego, Calif.

[21] Appl. No.: 09/461,124

[22] Filed: Dec. 14, 1999

Related U.S. Application Data

[63] Continuation-in-part of application No. 09/229,374, Jan. 13, 1999, abandoned.

[51] Int. Cl.[7] .............................. A23B 7/153; A23B 7/16; A23L 3/34; A23L 3/3454
[52] U.S. Cl. .......................... 426/310; 426/302; 426/321; 426/654
[58] Field of Search ..................... 426/102, 268, 426/270, 302, 262, 310, 321, 333, 442, 654

[56] References Cited

U.S. PATENT DOCUMENTS

| | | | |
|---|---|---|---|
| 1,685,392 | 9/1928 | Beadle | 426/125 |
| 1,817,875 | 8/1931 | Broadbent | 426/419 |
| 2,333,887 | 11/1943 | Redlinger | 426/125 |
| 2,864,708 | 12/1958 | Tebbens | 426/125 |
| 3,037,867 | 6/1962 | Daudin et al. | 426/310 |
| 3,333,967 | 8/1967 | Burg | 426/419 |
| 3,415,661 | 12/1968 | Sincock | 426/125 |
| 3,450,542 | 6/1969 | Badran | 426/419 |
| 3,450,544 | 6/1969 | Dadran | 426/419 |
| 3,950,559 | 4/1976 | Kapoor et al. | 426/419 |
| 4,006,259 | 2/1977 | Kalmar | 426/306 |
| 4,207,347 | 6/1980 | D'Atri et al. . | |
| 4,532,156 | 7/1985 | Everest-Todd . | |
| 4,649,057 | 3/1987 | Thomson . | |
| 4,803,085 | 2/1989 | Findly . | |
| 5,030,510 | 7/1991 | Yokoyama et al. . | |
| 5,093,080 | 3/1992 | Keller . | |
| 5,128,159 | 7/1992 | Sayles . | |
| 5,148,738 | 9/1992 | Orman et al. . | |
| 5,376,391 | 12/1994 | Nisperos-Carriedo . | |
| 5,427,807 | 6/1995 | Chum et al. . | |
| 5,489,442 | 2/1996 | Dunn et al. . | |
| 5,547,693 | 8/1996 | Krochta et al. . | |
| 5,658,607 | 8/1997 | Herdman | 426/419 |
| 5,942,270 | 8/1999 | Oganesoff et al. | 426/268 |

FOREIGN PATENT DOCUMENTS

| | | |
|---|---|---|
| 58-081735 | 5/1983 | Japan . |
| 60-004102 | 1/1985 | Japan . |
| 63-042646 | 2/1988 | Japan . |
| 06038626 | 2/1994 | Japan . |
| 07059464 | 3/1995 | Japan . |
| 1353398 | 11/1987 | Russian Federation . |
| 1375221 | 2/1988 | Russian Federation . |
| 1793881 | 2/1993 | Russian Federation . |

OTHER PUBLICATIONS

A paper prepared by the applicant entitled "Preservation Coating for Bananas" describing the maturation process and current technologies for the preservation of bananas.
DuPont Specification Sheet on "ELVANOL" brand polyvinyl alcohols.
Corn Products/Casco, Technical and Quality Data, Globe 10 de Maltodextrin, Aug. 1997.
Archer Daniels Midland Co., Emulsifying with ADM Lecithin, Dec. 1997.
J. of the Korean Agricultural Chem. Soc., 1970, 13(2), pp. 131–151.
Pischchevaya Promyshlennost' USSR, 1989, No. 3, pp. 66–67.
Khimicheskikh Nauk (No. 3), pp. 22–27, 1989.
Izvestiya Akademii Nauk Moldavsloi SSR. Biologicheskie I Khimicheski Nauki (No. 4), 1989, pp. 64–69.

*Primary Examiner*—Milton Cano
*Attorney, Agent, or Firm*—Thomas R. Juettner

[57] ABSTRACT

Fresh produce is preserved by coating the exterior surface of the produce with a coating composition comprising an aqueous solution of from about 1 to about 20 percent by weight of substantially hydrolyzed cold water insoluble polyvinyl alcohol, about 0.1 to about 10 percent by weight of low molecular weight cold water soluble starch, and about 0.03 to about 5 percent by weight of surfactant. Optional constituents include antimicrobials and plasticizers. The coating composition is effective to control respiratory exchange, i.e., the passage of gases, particularly oxygen, ethylene and carbon dioxide, into and out of the produce, thereby to control maturation and ripening of the produce.

20 Claims, No Drawings

PROCESS FOR PREVENTING FRESH PRODUCE AND COATING COMPOSITION THEREFOR

CROSS REFERENCE

This application is a continuation-in-part of application Ser. No. 09/229,374, filed Jan. 13, 1999 now abandoned.

FIELD OF THE INVENTION

The present invention is directed to a process for preserving fresh produce by coating the same with a coating composition capable of controlling the transmission of gases into and out of the produce during maturation and/or ripening of the produce.

BACKGROUND

Current techniques for the preservation of fresh produce consist of temperature and/or pressure treatment or control, wax and similar coating techniques, synthetic polymer coating techniques, and polymer packaging.

Various coating compositions have been proposed, e.g., a petroleum solvent solution of a waxy film former and a fungicide (U.S. Pat. No. 4,006,259), a mixture of lard, tallow and lecithin applied in molten state (U.S. Pat. No. 4,207,347), hydrogenated jojoba oil (U.S. Pat. No. 4,356,197), a salt of carboxylic acid and an alkyl amine (U.S. Pat. No. 4,532,156), a 3% oil-in-water emulsion of hydrogenated vegetable oil, stearic acid and an anionic emulsifier (U.S. Pat. No. 4,649,057), the combination of a food acid, an edible reducing agent and a carbohydrate thickener followed by freezing (U.S. Pat. No. 4,751,091), a denatured proteinaceous solution of soybeans, wheat and corn (U.S. Pat. No. 5,128,159), simultaneously scrubbing and drenching with a liquid containing a fungicide (U.S. Pat. No. 5,148,738), a slurry consisting of by-products of the produce and certain sugars and acids (U.S. Pat. No. 5,364,648), a mixture of a polysaccharide polymer, a preservative, an acidulent and emulsifiers (U.S. Pat. No. 5,198,254), and a light-activated composition (U.S. Pat. No. 5,489,442).

Some Russian and Japanese publications have proposed the use of polyvinyl alcohol as a gas barrier coating for produce, but few if any of these suggestions have found their way into the commercial market.

Various forms of produce packaging are disclosed, by way of example, in U.S. Pat. Nos. 4,769,262; 5,030,510; 5,093,080; 5,160,768; 5,427,807; 5,547,693; and 5,575,418.

In the case of bananas, to which the present invention has particular application, the bananas are harvested in a green, unripened state, washed to remove field debris, and refrigerated for shipment via "reefer boats" (refrigerated vessels) to a point of distribution. At destination, the green bananas are transferred to cold storage warehouses where they remain until transferred to temperature controlled ripening rooms. In the ripening rooms, the bananas are exposed to ethylene gas to trigger the ripening process. Once triggered, the ripening process cannot be halted and the bananas must be delivered in real time to retail outlets for sale before the bananas become overripe, discolored and unsalable. Green tomatoes are treated in a similar fashion.

Coating the produce with a solvent solution of natural wax products will extend their storage life, but the solvent for the wax can be both expensive and environmentally hazardous. Consequently, wax coatings have not met with widespread acceptance.

A synthetic polymer coating for bananas, available under the brand name "SEMPERFRESH", is based on sucrose esters of fatty acids. The bananas are coated by dipping in a dilute suspension of the SEMPERFRESH product and allowed to dry, which results in a thin, invisible coating on the surface of the peel. In a study of the effect of SEMPERFRESH coatings on the preservation of bananas transported under refrigerated conditions and stored under non-refrigerated conditions, ripening was found to be delayed without adverse effect on flavor. However, the coating only allowed storage of bananas at ambient temperatures for about 10 days.

Enclosing bananas in polyethylene bags is also effective. The thickness and porosity of the packaging must be appropriate to the physiological reactions of the fruit. This results in the creation of a modified atmosphere that slows water loss and respiratory exchange, but also induces undesirable symptoms due to asphyxia. Here again, the use of polyethylene bags allows storage of bananas at ambient temperatures for only a few days.

SUMMARY OF THE INVENTION

The object of the invention is to provide a new, improved and highly economical process for preserving fresh produce.

Another object is to provide a process for preserving fresh produce that prolongs the period during which the produce may be stored at ambient temperatures without critical deterioration of the produce.

A further object is to provide a process for preserving fresh produce that significantly delays maturation and ripening of freshly harvested produce and therefore prolongs the duration of time between harvesting and the state in which the produce is in prime condition for consumption.

A still further object of the invention is to provide a new and improved coating composition for the preservation of fresh produce.

In accordance with the invention, the new and improved process resides in the application to the exterior surface of fresh produce of a coating composition comprising an aqueous solution of from about 1 to about 20 percent by weight of substantially hydrolyzed cold water insoluble polyvinyl alcohol, about 0.1 to about 10 percent by weight of low molecular weight cold water soluble starch, and about 0.03 to about 5 percent by weight of surfactant. Optional additional ingredients include antimicrobials, plasticizers and antifoaming agents.

The coating composition limits but does not prevent respiratory exchange, i.e., transmission of oxygen (air) into the produce and transmission of excess ethylene gas and carbon dioxide out of the produce, thereby to control, typically to prolong, the maturation and ripening process and, in turn, to increase the permissible storage time between harvest and consumption.

These and other objects and advantages of the invention will become apparent to those of reasonable skill in the art from the following detailed description.

DETAILED DESCRIPTION OF PREFERRED EMBODIMENTS

The following is a detailed description of certain embodiments of the invention which are presently deemed by the inventors to be the best mode of carrying out the invention. Drawings are not deemed necessary inasmuch as the following description will enable any person skilled in the art to make and use the invention.

As above indicated, the invention resides in the discovery that application of a specially formulated coating composition to the exterior surface of fresh fruits and vegetables, especially those having a peel, rind or skin, significantly delays maturation and ripening of the fruits and vegetables. This in turn prolongs the duration of time between harvest and optimum conditions for consumption so that more widespread distribution of fresh fruits and vegetables is accommodated. Additionally, the need for specialized transportation and storage equipment and conditions, such as refrigeration, can in many cases be eliminated or at least alleviated.

Pursuant to the invention, the coating composition is preferably and most easily and economically applied to the exterior surfaces of selected fruits and vegetables by application of a dilute liquid solution which is subsequently permitted to dry.

The solution is preferably aqueous and comprised of water containing from about 1% to about 20%, preferably from about 1% to about 10%, by weight of an FDA approved, cold water insoluble grade of polyvinyl alcohol (PVOH), such as the substantially hydrolyzed hot water soluble polyvinyl alcohol available from DuPont under the brand name "ELVANOL" and the grade designation 70-06; from about 0.1% to about 10% by weight of a low molecular weight cold water soluble starch, such as maltodextrin having a molecular weight of 6,000–50,000, available from the Casco and Corn Products Divisions of CPC International, Inc. under the trade designation GLOBE 10 DE MALTODEXTRIN, (1900) PIN019100; and from about 0.03% to about 5% by weight of surfactant, suitably lecithin, but more preferably dioctyl sodium sulfosuccinate.

Optionally, the coating composition may also include either or all of from about 0.05% to about 5% antimicrobial, preferably triclosan and more preferably methylparaben, from about 0.1% to about 5% plasticizer, e.g., glycerin, and from about 0.001% to about 0.005% of an antifoaming agent, such as polydimethylsiloxane.

The concentration of the PVOH and the starch in the solution will in general determine the thickness of the coating on the produce and the duration of time over which maturation and ripening are delayed or abated.

The aqueous solution may be applied to the produce in any suitable or customary manner, e.g., by dipping the produce in a tank or vat of the solution, by spraying the solution onto the produce, or by passing the produce through a downwardly falling curtain or waterfall of the solution.

When the produce is coated by dipping or passage through a liquid curtain, the coating composition may suitably have a high solids content such as 3–20% by weight cold water insoluble polyvinyl alcohol, 5–10% by weight cold water soluble starch and 1–5% by weight surfactant. If the produce is coated by spraying and/or a lighter coat weight is desired, the composition should have a lower solids content, such for example as 1–10% polyvinyl alcohol, about 0.1 to about 5% starch and about 0.03 to about 1.5% surfactant. For spray application, the solids content preferably should not exceed about 4–5%.

While the precise mode in which the coating composition functions is not known, it is believed that the starch imparts porosity to what would otherwise be the gas barrier function of the PVOH, thereby enabling the coating to "breathe". The extent to which breathing or respiration is accommodated is believed to be a function of the physiological reactions of the species of produce and the relative ratios and the concentration of the PVOH and the starch. The coating enables limited transmission of oxygen, i.e., air, into the produce to support the maturation process, but at a significantly slower rate than would be the case without the coating. The "breatheability" of the coating also permits the transmission or passage out of the produce of the ethylene and carbon dioxide gases produced during the maturation process, thereby slowing the process without causing the produce to liquify or soften unduly as is the case with barrier coatings.

The cold water insoluble substantially hydrolyzed PVOH acts as a binder for the starch and prevents dissolution of the coating due to incidental cold water exposure, e.g., humidity, condensation, rain and flushing with cold water.

The surfactant reduces the surface tension of the starch and the PVOH and facilitates the formation of a very uniform and homogeneous coating composition. Also, it enhances the ability of the composition to uniformly coat and adhere to the produce.

The antimicrobial protects the ripening produce from mold and parasitic infestation. Tests conducted at laboratories in Hawaii indicate that the coating composition of the invention can terminate Medfly larvae in infected fruit and may serve to supplement existing quarantine methods. Thus, the antimicrobial is, in most instances, an effective and viable additive.

An antifoaming agent is recommended when produce is being processed commercially. Blending of the constituents of the coating without an agent frequently results in foaming and a consequent delay in the time of usefulness due to the elapse of time before which the foam dissipates and the blended composition is ready for use. An antifoaming agent eliminates the delay and is employed primarily as a matter of production expediency.

A plasticizer, e.g., glycerin, when used, functions as a lubricant for the polyvinyl alcohol and permits polymer molecule chains to move and rotate so that, during such molecular movement, gas molecules have a greater chance to escape from or gain entry to the produce. Also, the lubricant facilitates uniform distribution and adherence of the coating to the produce, and renders the coating non-brittle. Use of a plasticizer may therefore prove desirable.

Additionally, by blending the PVOH, starch and surfactant in different proportions, the coating can be tailored to provide different permeabilities to the gas or gases involved, i.e., oxygen, carbon dioxide and/or ethylene, thereby to tailor the coating to the respiratory exchange cycles of a variety of fruits and vegetables.

The coating solution is appropriately prepared by stirring the PVOH into hot water at a temperature of about 80° C. (176° F.) for approximately 30 minutes until the PVOH is completely dissolved and a clear solution obtained. The solution is then cooled. When the PVOH/water solution has cooled to room temperature, the starch and surfactant, and the optional constituents if used, are added under stirring for about 10 minutes.

In the case of bananas and other fruits and vegetables having an initial preservation period between harvesting and initiation of the ripening process and a second preservation period between initiation of the ripening process and the time of consumption, the coating process of the invention may be employed for purposes of preservation in either or both of the two periods. For example, green unripened freshly harvested bananas may be dipped in, sprayed with or passed through a curtain of the coating solution of the invention to serve the dual purposes of rinsing field debris and traces of agro-chemicals from the bananas and to apply the coating to the bananas. The bananas are then prepared for shipment. This coating step does not add any labor costs to the crop because the bananas are in any event rinsed with water prior to shipment.

The cost of the coating is recouped by virtue of the fact that during shipment and subsequent storage the conventional requirement for refrigeration may either be eliminated or significantly reduced. The cost savings achieved by reduced refrigeration requirements and reduced deterioration losses also covers or exceeds the cost of the additional processing required when the ripening process is initiated, as described below.

When it is desired to initiate the ripening process, the bananas are removed from storage and transferred to ripening rooms. With coatings previously proposed, the coated bananas had to be rinsed with a solvent to remove the coating so that the ethylene gas would have unimpeded access to the bananas when the gas is introduced into the ripening rooms. Due to the breathability of the coating of the invention, washing, i.e., rinsing with warm or hot water, prior to gassing is not necessary. The bananas may be gassed with the coating in place.

After the bananas have been exposed to ethylene gas, the bananas may again be coated, or if not previously coated may now be coated, with the aqueous coating solution to delay or abate the ripening process for an additional period of time, Contrary to prior practice, wherein it was understood that once triggered the ripening process could not be halted, the present invention is effective to delay or slow down such process and therefore provide a longer period for marketing of the bananas.

In one example of an experimental comparative test, substantially identical green and hard but previously gassed bananas were purchased from a local distributor. Some of the bananas were coated by dipping the same for about 10 seconds into an aqueous solution containing 10% by weight of "ELVANOL" 70-06 PVOH and 10% by weight of CASCO, GLOBE 10 DE MALTODEXTRIN 1910, followed by drying in ambient air. Other of the bananas were not treated in any manner. The bananas were then left to ripen under identical conditions in ambient air at a room temperature of about 28° C. (72° F.). After six days, the uncoated bananas were completely yellow with some black spots on the surface, and after 8 and 10 days, the color was dark and the bananas very soft. In contrast, after 8 and 10 days, the coated bananas showed a yellow color and were still firm.

A coating composition suitable for dip coating bananas and the like comprises an aqueous solution containing about 10% by weight of substantially hydrolyzed PVOH, about 10% by weight of water soluble maltodextrin starch and about 2% by weight of lecithin, and optionally one or the other or both of about 2% by weight of triclosan and about 1% to 5% by weight of glycerin.

In a similar experimental test, substantially identical green and firm tomatoes were picked directly from the field about 2–3 days earlier than normal. Some of the tomatoes were coated with an aqueous solution comprised of 5% by weight of "EVANOL" 70-06 PVOH and 5% by weight of CASCO GLOBE 10 DE MALTODEXTRIN 1910 starch. Based on experimental data, the coating thickness suitable for tomatoes is thinner than that suitable for bananas; thus, the lower solids content of the tomato coating composition. Other of the tomatoes were not treated in any manner. The uncoated tomatoes turned red after four days and became soft after 6–7 days. In contrast, after nine days, the coated tomatoes remained essentially green in color and were still firm.

Based on the experiments, a coating composition appropriate for dip coating tomatoes and the like comprises an aqueous solution containing about 5% by weight of substantially hydrolyzed cold water insoluble PVOH, about 5% by weight of cold water soluble maltodextrin starch and about 2% by weight of lecithin, and optionally, one or the other or both of about 2% by weight of triclosan and about 1–5% by weight of glycerine.

Additional tests have been conducted with another, and presently preferred, coating composition formulation comprised by weight percent (w/w) of about 5% substantially hydrolyzed PVOH, about 0.5% maltodextrin, about 0.05% dioctyl sodium sulfosuccinate, about 0.05% methylparaben, about 0.005% polydimethylsiloxane and about 94.4% water.

Test 1: Ungassed green bananas were divided into a control group and a test group. The bananas in the control group were not coated. The bananas in the test group were dipped in the 5% PVOH coating composition and dried with a fan. Both groups were stored at the ambient environment (55–65° F.; 55–65% RH-relative humidity) Visual observations for color changes were taken weekly. On day 28 after coating, the controls began to "break" in color, while the coated fruits remained green. On day 33, the coated fruits began to "break". On day 42, the controls were yellow with flecks of brown while the coated fruits were yellow and green. The coating composition thus extended the green-life of ungassed bananas approximately 2 weeks at ambient storage conditions.

Test 2: Three boxes of green plantains were purchased from a local fruit distributor. One box of plantains was set as control, and the other two boxes were coated respectively with a 5% and a 7% PVOH coating, composition. All fruits were placed in a refrigerator at 58° F. and 90% RH. The controls began to "break" color on day 8 and ripen quickly afterward, while both coated fruits (5% and 7%) began to "break" on day 13 and then ripened more slowly than the controls. The PVOH coatings extended the plantain green-life for an extra week at the test storage conditions.

Test 3: Green and firm avocados were purchased from a local supermarket. Half the fruits were coated with a 5% PVOH coating composition, dried and stored at ambient environment (55–65° F. and 55–65% RH). During avocado ripening, the color changes from green to brown and the tissue gradually becomes soft. On day 3, the controls began to "break" in color and firmness, while the coated fruits were still green and firm. On day 15, the controls were completely brown in color and the tissue was very soft, while the coated fruits had just begun to "break". On day 21, all of the avocados were opened. The controls had decayed. The coated fruits remained of good quality. The PVOH coating composition delayed avocado ripening for approximately 10 days at ambient storage conditions.

Test 4: Green and firm mangoes were purchased from a local supermarket. Half were coated with a 5% PVOH coating composition, dried and stored at ambient environment (55–65° F. and 55–65% RH). During mango ripening, the color changes from green to yellow and the tissue gradually becomes soft. The controls began to "break" in both color and firmness on day 3 and then ripened quickly, while the 5% coated fruits began to "break" on day 9 and ripened more slowly than the controls. On day 19, the uncoated fruits were overripe (completely yellow and very soft), while the 5% coated fruits were significantly greener and firmer than the controls. The PVOH coating composition delayed mango ripening approximately one to two weeks at ambient storage conditions.

Test 5: Papayas with about 30% yellowness and softness were purchased from a local supermarket. Half the fruits were coated with 5% PVOH coating composition, dried and stored at ambient environment (55–65° F. and 55–65% RH). The controls and the coated papayas continuously ripened after coating, since the ripening process had been initialized before coating. However, the ripening process of the coated fruits was observed to be significantly slower than the controls. Also, mold growth showed on the controls but not on the coated fruits. The coating slowed the papaya ripening process and mitigated mold growth.

Test 6: Green limes were purchased from a local fruit distributor and some of them were coated with a 2% PVOH coating composition, dried and stored in a refrigerator at 48° F. and 90% RH. During the commercial storage or transport of limes, the green color gradually changes from green to yellow, which decreases the market value. In this test, it was found that, on day 26 after coating, the controls had mostly turned yellow in color, while the 2% PVOH coated fruits were still green. The coating composition significantly controlled yellowing of the limes.

Test 7: Shelf-life Field Test: Two pallets (96 boxes) of green bananas were used in this field test. Of them, 92 boxes were used for a 4% PVOH coating composition and 4 for controls. The coated bananas were prepared by dipping, draining and packing wet in standard carton boxes with polyethylene liners. All bananas were held at 58° F. and 90% RH for a four week shelf-life extension test. The evaluations based on color and firmness were carried out four weeks after coating. The results showed that, at four weeks (total five weeks from harvest) the controls began to "break", while all coated bananas were still green. The coated bananas began to "break" five days later. Green life was extended from four to seven days.

Test 8: Shelf-life Field Test: One pallet of freshly harvested mangoes (216 boxes) were used for a test carried out in a field packing house. Twenty boxes were used as controls and the rest were grouped half for a 3% PVOH coating composition and half for a 5% PVOH coating. All fruits were pretreated according to standard production procedures. The coating operation consisted of dipping, draining and packing wet in standard carton boxes. All coated mangoes along with the controls were placed in a 50° F. cold storage room awaiting transport. On day 5, the fruits were transported by refrigerated truck from the packing house to the distributor (2 days), and held at 50° F/ and 90% RH for the shelf-life extension test. Evaluations were based on ripening percentage (by gentle pressure) and changes of color, tested firmness and Brix (Refractometer). At 2 weeks, the controls were over-ripe and considered unsaleable, while the 3% coated fruits just began ripening and the 5% coated fruits were still green and firm. At 3.5 weeks, the 3% coated fruits developed excellent quality and sold at a good market price. At 4.5 weeks the 5% coated fruits were still slightly green and firm and sold at a good market price. The PVOH coatings extended the mango shelf-life from one to three weeks.

Additional fruits and vegetables that are likely candidates for successful practice of the invention include apples, strawberries, raspberries, corn, carrots, celery, peppers, potatoes, broccoli and leafy vegetables.

All of the constituents of the coating composition are generally regarded as safe ("gras"). Nevertheless, for produce that is customarily consumed without removing a rind or peel, e.g., tomatoes, apples, and the like, it is recommended that the coating be removed prior to consumption by rinsing in warm water.

As shown by the experimental tests, the coating process of the invention significantly enhances control over respiratory exchange, i.e., the gas permeability properties of the coated produce, and contributes significantly to prolonged shelf life of fruits and vegetables. Also, the coating inhibits mold growth and exhibits potential for microbe, bacteria and Medfly control. In addition, the coating may prove useful in controlling bud development in blossoming plants and other like applications.

The objects and advantages of the invention have therefore been shown to be attained in a convenient, economical, practical and facile manner.

While certain preferred embodiments of the invention have been herein described, it is to be appreciated that various changes, rearrangements, modifications and additions may be made thereto without departing from the scope of the invention as defined by the appended claims.

What is claimed is:

1. A process for preserving fresh produce comprising the step of coating the exterior surface of the produce with a coating composition comprising an aqueous solution of from about 1 to about 20 percent by weight of substantially hydrolyzed cold water insoluble polyvinyl alcohol, about 0.1 to about 10 percent by weight of low molecular weight cold water soluble starch, and about 0.03 to about 5 percent by weight of surfactant.

2. A process as set forth in claim 1 wherein the starch comprises maltodextrin.

3. A process as set forth in claim 1 wherein the surfactant comprises lecithin or dioctyl sodium sulfosuccinate.

4. A process as set forth in claim 1 wherein the coating composition includes from about 0.05 to about 5 percent by weight antimicrobial.

5. A process as set forth in claim 4 wherein the antimicrobial comprises triclosan or methylparaben.

6. A process as set forth in claim 1 wherein the coating composition includes from about 0.1 to about 5 percent by weight of plasticizer.

7. A process as set forth in claim 6 wherein the plasticizer comprises glycerin.

8. A process as set forth in claim 1 wherein the produce comprises freshly harvested unripened produce.

9. A process as set forth in claim 1 wherein the produce comprises freshly harvested unripened produce and the coating is applied after the produce has been exposed to a gas to initiate ripening of the same.

10. A process as set forth in claim 9 wherein the produce comprises freshly harvested green unripened bananas or freshly harvested green unripened tomatoes.

11. A coating composition for the preservation of fresh produce comprising an aqueous solution of from about 1 to about 20 percent by weight of substantially hydrolyzed cold water insoluble polyvinyl alcohol, about 0.1 to about 10 percent by weight of low molecular weight cold water soluble starch, and about 0.03 to about 5 percent by weight of surfactant.

12. A coating composition as set forth in claim 11 wherein the starch comprises maltodextrin.

13. A coating composition as set forth in claim 11 wherein the surfactant comprises lecithin or dioctyl sodium succinate.

14. A coating composition as set forth in claim 11 including from about 0.05 to about 5 percent by weight antimicrobial.

15. A coating composition as set forth in claim 14 wherein the antimicrobial comprises triclosan or methylparaben.

16. A coating composition as set forth in claim 11 including from about 0.1 to about 5 percent by weight of plasticizer.

17. A coating composition as set forth in claim 11 comprised of about 10% by weight of the polyvinyl alcohol, about 10% by weight of the starch, and about 2% by weight of the surfactant.

18. A coating composition as set forth in claim 11 comprised of about 5% by weight of the polyvinyl alcohol, about 5% by weight of the starch, and about 2% by weight of the surfactant.

19. A coating composition for the preservation of fresh produce comprising an aqueous solution containing by weight percent from about 1 to about 10% substantially hydrolyzed cold water insoluble polyvinyl alcohol, from about 0.1 to about 5% cold water soluble starch, from about 6.03 to about 1.5% surfactant, and from about 0.05 to about 5% antimicrobia.

20. A coating composition as set forth in claim 19 wherein the solution contains from about 2 to about 7% of the polyvinyl alcohol, about 0.5% maltodextrin starch, about 0.05% dioctyl sodium sulfosuccinate surfactant, and about 0.05% methylparaben antimicrobial.

* * * * *